Patented Apr. 4, 1939

2,152,851

UNITED STATES PATENT OFFICE 2,152,851

SOLUTION OF ALKALI METAL SALTS OF POLYNUCLEAR PHENOLS

Hans Z. Lecher, Plainfield, and Mario Scalera, Somerville, N. J., assignors to The Calco Chemical Company, Inc., Bound Brook, N. J., a corporation of Delaware No Drawing. Application September 4, 1936, Serial No. 99,486

16 Claims. (Cl. 260—621)

This invention relates to solutions of alkali metal salts of polynuclear phenols. More particularly the invention relates to solutions of sodium and potassium naphtholates in inert organic solvents.

Alkali metal salts of polynuclear phenols are not soluble in many classes of organic solvents. In fact, they have hitherto only been dissolved in water, alcohols and naphthols. Solutions in such media which contain reactive hydroxyl groups or water are not usable for reactions which require inert and dry solutions. This has rendered many reactions with sodium salts of polynuclear phenols difficult or unsatisfactory. For example, when it is desired to produce corresponding hydroxy acids by a Kolbe synthesis relatively poor yields are obtained and the reaction mixture is frequently contaminated with highly colored materials such as tars.

The present invention is based on the discovery that alkali metal salts of polynuclear phenols can be dissolved in inert solvents which are characterized by six-membered heterocyclic rings containing oxygen as the only noncarbon element. These solvents, although inert chemically, possess sufficient solvent action on alkali metal salts of polynuclear phenols, so that the latter can be obtained in solution.

The solvents used in the present invention are heterocyclic ethers containing ring systems included in the group consisting of 1.4 dioxane

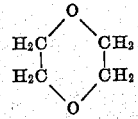

and 1.3 dioxane (metadioxane)

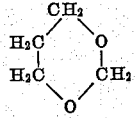

1.4 dioxene

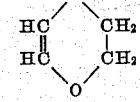

1.3 dioxene

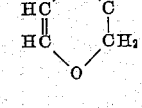

1.4 dioxine

The simplest solvents of this type are dioxane, metadioxane and 1.4 dioxene. Derivatives containing these ring systems which are free from reactive groups may also be used for example, alkyl substituted and ether substituted derivatives such as 2 methyl metadioxane, 2.5 dimethylparadioxane, 2.3 diphenylparadioxane, 2.3 diethoxydioxane

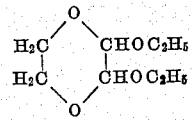

and the like. Condensed or polynuclear derivatives may also be used such as benzo 1.3 dioxene (saligenin methylene ether)

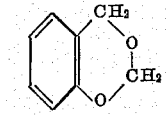

benzo 1.4 dioxene (pyrocatechol ethylene ether)

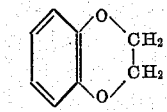

dibenzo 1.4 dioxine (diorthaphenylene dioxide)

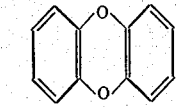

Compounds containing 2 dioxane rings are also useful such as the naphthodioxanes (glyoxal bisethylene acetals)

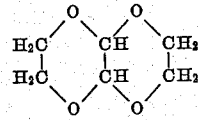

and the corresponding benzo compounds glyoxal-bis-orthophenylene acetals

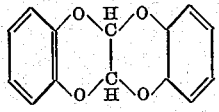

Some of these solvents are liquids at ordinary temperatures such as 1.4 dioxane and others are solids and, of course, are used as solvents at temperatures above their melting point. For most purposes for which the solutions of the present invention are practically used, however, high temperatures are necessary, and therefore solvents which are solid at ordinary temperatures are entirely suitable. In fact, for many cases they are preferable as they are higher boiling and permit obtaining higher temperatures.

The most important polynuclear phenol, the alkali metal salts of which can be dissolved according to the present invention are, of course, the naphthols alpha and beta. The invention, of course, is not limited to these two compounds but is generally usable with polynuclear phenols in which there are not sufficient polar groups to render their alkali metal salts insoluble in the solvents of the present invention. Examples of such polynuclear phenols are alpha and beta anthrolhydroxy carbazols, hydroxy naphthocarbazols, dihydroxydiphenyl, especially the 4, 4' isomer; dihydroxynaphthalenes such as the 2.6 dihydroxynaphthalene; dihydroxyanthracene such as the 2.6 and 2.7 derivative; 4, 4' dihydroxydiphenylmethane; 2, 2' dihydroxydinaphthylmethane; 4,4' dihydroxydiphenylamine; mono and dihydroxyanthraquinone, and the leuco compounds of many vat dyes. In general, the mono alkali metal salts of polyhydroxy, polynuclear compounds are more soluble than the corresponding dialkali metal salts. The solubility of all of the polynuclear phenols is not the same in any one of the solvents of the present invention and the solubility of any given polynuclear phenol in different solvents of the present invention of course will also vary. In many cases the solubility at lower temperatures is not sufficient and solutions must be prepared at higher temperatures. In some cases, this necessitates using some of the higher boiling heterocyclic solvents of the present invention. In each case, of course, the solvents best suited for the particular conditions will be chosen.

The solutions of the present invention may be prepared in many ways. Thus, for example, the alkali metal salt of the polynuclear phenols may be dissolved in the solvent. In other cases, it is desirable to dissolve the phenol itself and react it with sodium or sodamide in the presence of the solvent.

Another important method of producing solutions of the present invention is in connection with the production of the polynuclear phenol by an alkali fusion. Thus, for example, when a naphthalene monosulfonate is fused with caustic alkali to form the alkali naphtholate, this crude material which contains excess caustic alkali and alkali metal sulfite may be leached or otherwise treated with the solvent which will dissolve the alkali metal naphtholate or corresponding other polynuclear phenol, leaving the sulfite and caustic alkali undissolved. This method is particularly attractive because it eliminates any necessity of recovering the alkali metal salt of the polynuclear phenol or the phenol itself from the metal, and is therefore much cheaper. At the same time it produces a very high grade of product and can be used as a step in producing the polynuclear phenol from the alkali melt itself. Thus, for example, while very pure betanaphthol is desired, the sodium betanaphtholate may be dissolved out of an alkali fusion, the hydrate precipitated from the solvent by water and transformed into pure betanaphthol by means of acid.

In another modification the polynuclear phenol is caused to react with caustic alkali in the solvent. Water is produced by the salt formation and this water can be removed by distillation with or without distilling off a portion of the solvent provided, however, that the solvent has a suitable boiling point. The water may also be removed by using a dehydrating agent such as caustic alkali, calcium oxide, barium oxide or calcium carbide.

Dehydration with caustic alkali which takes place at elevated temperature (between 50–100° C.) produces a lower layer containing water and caustic alkali. This procedure is however not feasible with potassium beta-naphtholate because of the formation of an insoluble dipotassium compound which probably has the formula

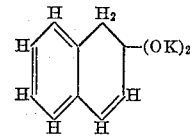

Usually the alkali metal salts of the polynuclear phenol such as naphthols, are somewhat more soluble in the solvents of the present invention when they contain one equivalent of water, and sometimes dehydration will result in precipitation of a portion of the compound.

Solutions whether completely anhydrous or not are included in the broad scope of the present invention.

While the invention is not limited to solutions which are completely anhydrous, anhydrous solutions are preferable for many reactions particularly for the production of hydroxy acids by the Kolbe synthesis. Thus, for example, the present invention produces solutions of naphtholates, either alpha or beta, which absorb carbon dioxide forming first the compounds $C_{10}H_7OCO_2Na(K)$ which, as a rule, are more soluble than the naphtholates and which are spontaneously converted into the insoluble salts of 1.2 and 2.1 hydroxy-naphthoic acids. These reactions take place even at room temperature. At higher temperatures the 2 hydroxy 3 naphthoic acid may also be produced, for example, by heating a solution of the betanaphtholate with carbon dioxide under pressure at temperatures from 225 to 275° C.

Because of its low price and good solvent action, 1.4 dioxane is the preferred solvent wherever its low boiling point does not interfere. Particularly, for the solutions of the alkali metal naphtholates dioxane is the most practical solvent material, as the solution can be effected at moderate temperatures and dehydration by means of sodium hydroxide is feasible to the practical extent at temperatures of 50–100° C. More complete dehydration may be effected with barium oxide or calcium carbide.

The invention will be described in greater detail in conjunction with the following examples which describe not only the products of solutions but in many cases also the use of the solutions, for example, in the production of hydroxy acids by the Kolbe synthesis. It should be understood that they are illustrative only and are not intended to limit the invention.

EXAMPLE 1

Three parts by weight of beta naphthol are dissolved in fifteen parts of dioxane. Two parts by weight of caustic soda—ground and powdered—are added. The mixture is stirred at room temperature until a sample of the solution gives a clear solution in water which indicates the absence of unreacted free naphthol. The temperature is then raised to 80–90° C. for a short period of time (10 to 15 minutes). The sodium hydroxide dehydrates the dioxane solution and forms a heavier aqueous layer. The two layers are separated by siphoning. One part of caustic soda is added to the dioxane layer and the process of dehydration is repeated in the same manner.

This time the sodium hydroxide does not form any more an aqueous layer.

Small amounts of water precipitate a trihydrate of sodium betanaphtholate, $C_{10}H_7ONa.3H_2O$, forming glistening colorless crystals which are only sparingly soluble in dioxane and which are very little stable in air.

When carbon dioxide is passed through the not dehydrated solution, sodium carbonate precipitates and free beta-naphthol remains dissolved. The dehydrated solution, however, absorbs carbon dioxide first without precipitation because the soluble salt of the carbonic ester is formed; later the salt of 2-hydroxy 1-naphthoic acid precipitates. For the preparation of the salt of 2-hydroxy 3-naphthoic acid a higher concentration (3 naphthol: 5 dioxane or 2 naphthol: 3 dioxane) is recommended; its formation takes place at 225–275° under $CO_2$=pressure.

EXAMPLE 2

Two parts by weight of beta-napthol are dissolved in ten parts of dioxane and two parts by weight of caustic soda are added. The mixture is agitated until a small quantity of it gives a clear solution in water, indicating a complete conversion of the naphthol to its sodium salt. Then the mixture is heated to 80–90° for a brief period of time (e. g., 15 min.) whereupon the excess of caustic separates out in a lower aqueous layer. The upper, dioxane, layer, thus dehydrated, is siphoned off. To it is added now one part by weight of ground calcium carbide, and the mixture is heated with stirring to 90–95° for 1 to 1½ hours. This operation removes all moisture. The dioxane is separated from the calcium oxide and unchanged calcium carbide by siphoning through a filter cloth.

EXAMPLE 3

Three parts by weight of beta naphthol are dissolved in fifteen parts of dioxane. The equivalent amount of caustic potash (powder) is added. Then it is proceeded like in Example 1, using also here sodium hydroxide as dehydrating agent.

The obtained solution of potassium betanaphtholate behaves to carbon dioxide like the solution of the sodium salt. When 1 equivalent potassium hydroxide is added to the dry dioxane solution of potassium betanaphtholate the dipotassium compound separates as bulky white precipitate. Then carbon dioxide yields potassium carbonate+beta naphthol.

EXAMPLE 4

A solution of sodium alpha naphtholate or potassium alpha naphtholate is prepared in an analogous manner as described in Example 1. Because of the lower solubility of the sodium alpha naphtholate the reaction with sodium hydroxide is carried out at 50–60° and the dehydration at boiling temperature.

A solution of sodium alpha naphtholate of the concentration stated in Example 1 separate crystals of sodium alpha naphtholate at room temperature, but the solution is complete above about 70°.

EXAMPLE 5

1975 parts by weight of caustic soda (95 per cent) and 400 parts of water are melted together in a fusion pot, and heated to 305° C. while stirred. Then 6540 parts by weight of moist sodium beta sulphonate (30 per cent water) are gradually added. Then the melt is kept at 300° for six hours. The melt is cooled and ground. Seven parts by weight of this melt, containing a mixture of sodium hydroxide, sodium sulfite and sodium betanaphtholate are mixed with fourteen parts by weight of dioxane and stirred for 15 minutes at 70–80°. The mixture is filtered off from the insoluble inorganic material which is washed with 1.4 parts of dioxane.

For the preparation of pure beta-naphthol from this solution one part by weight of water is added. The solution is now permitted to stand at room temperature for a period of two hours, when the sodium naphtholate has almost completely precipitated out in the form of the sparingly soluble hydrate. This is separated by filtration, and from it the beta-naphthol may be recovered by dissolving in water and acidifying. The beta-naphthol so obtained is in a high state of purity. The same dioxane may be used repeatedly to extract several batches of the melt.

EXAMPLE 6

15.0 parts by weight of beta-naphthol are dissolved in 100 parts by weight metadioxane. 10 parts by weight powdered sodium hydroxide are added. The mixture is stirred and slowly heated up to 100°. The sodium naphtholate formed is dissolved and the water formed gives a lower layer with the excess of sodium hydroxide. The two layers are separated above 85° and the metadioxane layer is dehydrated another time with 5 parts by weight sodium hydroxide.

The sodium beta-naphtholate stays in solution above 85, but separates at lower temperature. Carbon dioxide forms first the very soluble sodium salt of the carbonic ester, later the insoluble salt of 2-hydroxy-1-naphthoic acid precipitates.

EXAMPLE 7

A mixture of the two stereomeric naphthodioxanes was prepared by refluxing 2,3-dichlorodioxane and ethylene glycol in benzene under later addition of potash and by recrystallizing from toluene. 15 parts by weight of beta-naphthol and 120 parts by weight of naphthodioxane were molten together at 120–140°. Then the equivalent amount of sodium hydroxide was added which dissolved in the stirred liquid. Then about one fifth of the naphthodioxane and the water formed were distilled off about 210°. The dehydrated solution of sodium betanaphtholate may be reacted with carbon dioxide above the melting point of the naphthodioxane mixture, e. g., at 120–130°. The sodium salt of 2-hydroxy-1-naphthoic acid is formed.

EXAMPLE 8

6.5 parts by weight of beta-naphthol were dissolved in 65 parts by weight of 2,3-diethoxy-dioxane. The solution dissolved the equivalent amount of sodium hydroxide. However, the dehydration of this solution of sodium beta naphtholate is difficult.

EXAMPLE 9

10 parts by weight of beta-naphthol are dissolved in 125 parts by weight of dry benzo-1,4-dioxene. The equivalent amount of sodium hydroxide is added and the mixture is slowly heated under stirring. At 120° a clear solution is obtained. At higher temperature the water formed distills off. In order to ensure complete dehydration about one fifth of the benzo-dioxene is distilled off. The sodium beta-naphtholate stays in solution above 80° and may be reacted at this temperature with carbon dioxide.

EXAMPLE 10

*Dioxane solutions of the sodium salts of 2,2'-dihydroxy 1-1'-dinaphthylmethane*

A solution of 3 parts (2 equivalents) of sodium in 60 parts of hot methanol is added, with stirring, to a slurry of 20 parts of 2,2' dihydroxy-1,1-dinaphthylmethane in 60 parts of methanol. Methanol is then removed by continuously adding and distilling off dioxane until the boiling temperature reaches 101.5°. There remains a clear, deep blue solution of the sodium salt which is soluble in the hot dioxane but which precipitates almost completely when the solution is cooled.

A solution of the monosodium salt in dioxane may be prepared in exactly the same way except that one equivalent of sodium is used. The monosodium salt is soluble in cold dioxane and does not precipitate out.

The invention has been described in the specific examples primarily in connection with the use of the solutions as reaction material for producing hydroxy carboxylic acids. Of course, the solution may also be used for analogous reactions with other acid anhydrides. Examples of such anhydrides are $SO_3$, $SO_2$ and in some cases $CS_2$ and $COS$.

What we claim is:

1. A method of preparing a solution of an alkali metal polynuclear phenolate in a solvent having as its major component a heterocyclic ether containing ring systems included in the group consisting of 1,3-dioxane, 1,4-dioxane, 1,3-dioxene, 1,4-dioxene, and 1,4-dioxine which comprises reacting the polynuclear phenol and an alkali metal hydroxide in the solvent.

2. A method of preparing a substantially anhydrous solution of an alkali metal polynuclear phenolate in a solvent having as its major component a heterocyclic ether containing ring systems included in the group consisting of 1,3-dioxane, 1,4-dioxane, 1,3-dioxene, 1,4-dioxene, and 1,4-dioxine which comprises reacting the polynuclear phenol and an alkali metal hydroxide in the solvent and dehydrating the solution.

3. A method of preparing a substantially anhydrous solution of an alkali metal polynuclear phenolate in a solvent having as its major component a heterocyclic ether containing ring systems included in the group consisting of 1,3-dioxane, 1,4-dioxane, 1,3-dioxene, 1,4-dioxene and 1,4-dioxine which comprises reacting the polynuclear phenol and an alkali metal hydroxide in the solvent and dehydrating the solution by the aid of a substance included in the group consisting of sodium hydroxide, potassium hydroxide, calcium oxide, barium oxide and calcium carbide.

4. A method of preparing a substantially anhydrous solution of an alkali metal polynuclear phenolate in a solvent having as its major component a heterocyclic ether containing ring systems included in the group consisting of 1,3-dioxane, 1,4-dioxane, 1,3-dioxene, 1,4-dioxene and 1,4-dioxine which comprises reacting the polynuclear phenol and an alkali metal hydroxide in the solvent and dehydrating the solution by distilling off the water formed together with a part of the solvent.

5. A method of preparing a solution of an alkali metal naphtholate in a solvent having as its major component a heterocyclic ether containing ring systems included in the group consisting of 1,3-dioxane, 1,4-dioxane, 1,3-dioxene, 1,4-dioxene and 1,4-dioxine which comprises reacting the naphthol and an alkali metal hydroxide in the solvent.

6. A method of preparing a substantially anhydrous solution of an alkali metal naphtholate in a solvent having as its major component a heterocyclic ether containing ring systems included in the group consisting of 1,3-dioxane, 1,4-dioxane, 1,3-dioxene, 1,4-dioxene and 1,4-dioxine which comprises reacting the naphthol and an alkali metal hydroxide in the solvent and dehydrating the solution.

7. A method of preparing a substantially anhydrous solution of an alkali metal naphtholate in a solvent having as its major component a heterocyclic ether containing ring systems included in the group consisting of 1,3-dioxane, 1,4-dioxane, 1,3-dioxene, 1,4-dioxene and 1,4-dioxine which comprises reacting the naphthol and an alkali metal hydroxide in the solvent and dehydrating the solution by the aid of a substance included in the group consisting of sodium hydroxide, potassium hydroxide, calcium oxide, barium oxide and calcium carbide.

8. A method of preparing a substantially anhydrous solution of an alkali metal naphtholate in a solvent having as its major component a heterocyclic ether containing ring systems included in the group consisting of 1,3-dioxane, 1,4-dioxane, 1,3-dioxene, 1,4-dioxene and 1,4-dioxine which comprises reacting the naphthol and an alkali metal hydroxide in the solvent and dehydrating the solution by distilling off the water formed together with a part of the solvent.

9. A method of preparing a solution of sodium betanaphtholate in a solvent having as its major component a heterocyclic ether containing ring systems included in the group consisting of 1,3-dioxane, 1,4-dioxane, 1,3-dioxene, 1,4-dioxene and 1,4-dioxine which comprises reacting the betanaphthol and sodium hydroxide in the solvent.

10. A method of preparing a substantially anhydrous solution of sodium betanaphtholate in a solvent having as its major component a heterocyclic ether containing ring systems included in the group consisting of 1,3-dioxane, 1,4-dioxane, 1,3-dioxene, 1,4-dioxene and 1,4-dioxine which comprises reacting the betanaphthol and sodium hydroxide in the solvent and dehydrating the solution.

11. A method of preparing a substantially anhydrous solution of sodium betanaphtholate in a solvent having as its major component a heterocyclic ether containing ring systems included in the group consisting of 1,3-dioxane, 1,4-dioxane, 1,3-dioxene, 1,4-dioxene and 1,4-dioxine which comprises reacting the betanaphthol and sodium hydroxide in the solvent and dehydrating the solution by the aid of a substance included in the group consisting of sodium hydroxide, potassium hydroxide, calcium oxide, barium oxide and calcium carbide.

12. A method of preparing a substantially anhydrous solution of sodium betanaphtholate in a solvent having as its major component a heterocyclic ether containing ring systems included in the group consisting of 1,3-dioxane, 1,4-dioxane, 1,3-dioxene, 1,4-dioxene and 1,4-dioxine which comprises reacting the betanaphthol and sodium hydroxide in the solvent and dehydrating the solution by distilling off the water formed together with a part of the solvent.

13. A method of preparing a solution of sodium betanaphtholate in a solvent having as its major component 1,4-dioxane which comprises reacting the betanaphthol and sodium hydroxide in the solvent.

14. A method of preparing a substantially anhydrous solution of sodium betanaphtholate in a solvent having as its major component 1,4-dioxane which comprises reacting the betanaphthol and sodium hydroxide in the solvent and dehydrating the solution.

15. A method of preparing a substantially anhydrous solution of sodium betanaphtholate in a solvent having as its major component 1,4-dioxane which comprises reacting the betanaphthol and sodium hydroxide in the solvent and dehydrating the solution by the aid of a substance included in the group consisting of sodium hydroxide, potassium hydroxide, calcium oxide, barium oxide and calcium carbide.

16. A method of preparing a substantially anhydrous solution of sodium betanaphtholate in a solvent having as its major component 1,4-dioxane which comprises reacting the betanaphthol and sodium hydroxide in the solvent and dehydrating the solution by distilling off the water formed together with a part of the solvent.

HANS Z. LECHER.
MARIO SCALERA.

CERTIFICATE OF CORRECTION.

Patent No. 2,152,851.                                        April 4, 1939.

HANS Z. LECHER, ET AL.

It is hereby certified that error appears in the printed specification of the above numbered patent requiring correction as follows: Page 3, first column, line 63, for the word "separate" read separates; page 4, first column, line 7, for "2,2' dihydroxy-1,1-" read 2,2' dihydroxy-1,1'-; and second column, line 13, claim 7, for "mehod" read method; and that the said Letters Patent should be read with this correction therein that the same may conform to the record of the case in the Patent Office.

Signed and sealed this 6th day of June, A. D. 1939.

Henry Van Arsdale (Seal)                                       Acting Commissioner of Patents.